US008321907B2

(12) United States Patent
Isomura et al.

(10) Patent No.: US 8,321,907 B2
(45) Date of Patent: Nov. 27, 2012

(54) BROADCAST RECEIVING APPARATUS, BROADCAST RECEIVING METHOD, BROADCAST RECEIVING PROGRAM, AND BROADCAST RECEIVING CIRCUIT

(75) Inventors: Tsuyoshi Isomura, Gifu (JP); Masahiko Hyodo, Aichi (JP)

(73) Assignee: Panasonic Corporation, Osaka (JP)

( * ) Notice: Subject to any disclaimer, the term of this patent is extended or adjusted under 35 U.S.C. 154(b) by 504 days.

(21) Appl. No.: 10/588,543

(22) PCT Filed: Feb. 3, 2005

(86) PCT No.: PCT/JP2005/001982
§ 371 (c)(1),
(2), (4) Date: Aug. 7, 2006

(87) PCT Pub. No.: WO2005/076623
PCT Pub. Date: Aug. 18, 2005

(65) Prior Publication Data
US 2007/0130603 A1 Jun. 7, 2007

(30) Foreign Application Priority Data
Feb. 9, 2004 (JP) .................................. 2004-031775

(51) Int. Cl.
*H04N 7/20* (2006.01)
*H04N 7/173* (2011.01)
*H04N 7/16* (2011.01)

(52) U.S. Cl. .......... 725/152; 725/68; 725/101; 725/131; 725/139; 725/151

(58) Field of Classification Search ............... 725/68, 725/100–101, 131, 139, 151
See application file for complete search history.

(56) References Cited

U.S. PATENT DOCUMENTS

| 6,108,379 | A | * | 8/2000 | Shikakura et al. ............ 375/240 |
| 6,519,007 | B1 | * | 2/2003 | Nishida ........................ 348/467 |
| 6,535,717 | B1 | | 3/2003 | Matsushima et al. |
| 6,611,530 | B1 | | 8/2003 | Apostolopoulos |
| 6,757,654 | B1 | * | 6/2004 | Westerlund et al. .......... 704/262 |
| 2002/0071056 | A1 | * | 6/2002 | Iwata et al. ................... 348/571 |
| 2004/0218669 | A1 | * | 11/2004 | Hannuksela ............. 375/240.01 |
| 2005/0066089 | A1 | * | 3/2005 | Karaoguz et al. ............... 710/72 |
| 2005/0117643 | A1 | * | 6/2005 | Hatabu et al. ............. 375/240.12 |
| 2006/0126733 | A1 | * | 6/2006 | Boyce et al. ............. 375/240.12 |

FOREIGN PATENT DOCUMENTS

| JP | 09-321813 | 12/1997 |
| JP | 2003-224846 | 8/2003 |
| WO | 03/092302 | 11/2003 |
| WO | 2004/066706 | 8/2004 |

(Continued)

OTHER PUBLICATIONS

English translation of JP2002232809(A).*

(Continued)

*Primary Examiner* — Kristine Kincaid
*Assistant Examiner* — Gigi L Dubasky
(74) *Attorney, Agent, or Firm* — Wenderoth Lind & Ponack, L.L.P.

(57) ABSTRACT

An MPEG decoder decodes a video data packet for standard broadcasting to generate video data for standard broadcasting, and detects a decoding error thereof. A MPEG decodes a video data packet for broadcasting under rainfall to generate video data for broadcasting under rainfall. A synthesizing section generates a composite signal obtained by replacing a decoding error part of the video data for standard broadcasting with a corresponding part of the video data for broadcasting rainfall.

8 Claims, 8 Drawing Sheets

FOREIGN PATENT DOCUMENTS

| | | | |
|---|---|---|---|
| JP | 2000078116 A | * | 3/2000 |
| JP | 2001-103479 | | 4/2001 |
| JP | 2001-119702 | | 4/2001 |
| JP | 2002-009854 | | 1/2002 |
| JP | 2002-232809 | | 8/2002 |

OTHER PUBLICATIONS

International Search Report issued Apr. 3, 2008 in International (PCT) Application No. PCT/JP2005/001982.

Yuh-Feng Hsu et al., "MPEG-2 Spatial Scalable Coding and Transport Stream Error Concealment for Satellite TV Broadcasting Using Ka-Band", IEEE Transactions on Broadcasting, IEEE Service Center, Piscataway, NJ, US, vol. 44, No. 1, Mar. 1998, pp. 77-86.

Office Action (with English translation) dated Dec. 21, 2010 issued in corresponding Japanese Application No. 2006-524144.

Office Action issued Sep. 28, 2010 in corresponding Japanese Application No. 2006-524144 (with translation).

* cited by examiner

BROADCAST RECEIVING APPARATUS, BROADCAST RECEIVING METHOD, BROADCAST RECEIVING PROGRAM, AND BROADCAST RECEIVING CIRCUIT

TECHNICAL FIELD

The present invention relates to a broadcast receiving apparatus, a broadcast receiving method, a broadcast receiving program, and a broadcast receiving circuit for receiving a TV broadcast signal and decoding the received signal, as well as to a system incorporated with components for implementing functions substantially equivalent to those of the broadcast receiving apparatus, method, program, and circuit. More particularly, the present invention relates to a broadcast receiving apparatus, a broadcast receiving method, a broadcast receiving program, and a broadcast receiving circuit that enable to receive two or more kinds of TV broadcast signals for broadcasting a same program with a relatively high image quality and a relatively low image quality, as well as to a system incorporated with components for implementing functions substantially equivalent to those of the broadcast receiving apparatus, method, program, and circuit.

BACKGROUND ART

An FM (frequency modulation) system has been adopted as an exemplified modulation system in the BS (broadcasting satellite) analog broadcasting. In such a modulation system, while the receiving C/N ratio is about 10 dB or more, good receiving quality of pictures and sound is obtainable. However, once the receiving C/N ratio falls below about 10 dB, a truncation noise may be generated, which makes it impossible or difficult to obtain good receiving quality of pictures and sound. In the BS analog broadcasting, the receiving quality is degraded relatively moderately, as the receiving C/N ratio decreases.

On the other hand, in the BS digital broadcasting, once the receiving C/N ratio falls below a predetermined value due to rainfall or other reason, the receiving quality is drastically degraded, as compared with the BS analog broadcasting. In order to avoid such a drawback, a hierarchical modulation service has been provided in the BS digital broadcasting.

Specifically, in the BS digital broadcasting, at least seven modulation systems are available: 8PSK2/3, QPSK7/8, QPSK5/6, QPSK3/4, QPSK2/3, QPSK1/2, and BPSK1/2 modulation systems in Japan.

Among these, the bit rate of the 8PSK2/3 modulation system is the highest, and the transmission rate thereof is about 20 Mbps. The bit rate decreases stepwise in the order of the QPSK7/8, QPSK5/6, QPSK3/4, QPSK2/3, QPSK1/2, and BPSK1/2 modulation systems. The transmission rate of the BPSK1/2 modulation system having the lowest bit rate is about 2 Mbps.

In order to acquire high definition (HD) images in HDTV, a bit rate of about 20 Mbps is required to transmit MPEG-compressed data. In view of this, the 8PSK2/3 modulation system is adopted in the BS digital broadcasting of HDTV.

In the above modulation system, as far as the receiving C/N ratio is 9.5 dB or more, sufficiently high receiving quality is obtainable. However, once the receiving C/N ratio falls below about 9.5 dB, the receiving quality is drastically degraded, with the result that good receiving quality of pictures and sound is not obtainable. Specifically, whereas a required C/N ratio in frequency-modulation of the BS analog broadcasting is about 10 dB, a required C/N ratio in the 8PSK2/3 modulation system of the BS digital broadcasting is about 9.5 dB.

In other words, in the 8PSK2/3 modulation system of the BS digital broadcasting, once the receiving C/N ratio falls below about 9.5 dB, the receiving quality is drastically degraded. In view of this, a hierarchical modulation service has been provided to avoid such a drawback.

An example of the conventional digital TV broadcast receiver adaptive to the above hierarchical modulation service is disclosed in Japanese Patent No. 3,253,524. The publication discloses a receiver, wherein demodulation processes respectively suitable for upper layer information and lower layer information are implemented, and signal receiving is switched over between the upper layer information and the lower layer information.

The above hierarchical modulation service has been provided to transmit a video signal (also called as lower layer information) which exclusively carries video composing a base of a program and is stably receivable even in a weak signal receiving state, along with a video signal of a high quality (also called as upper layer information) with respect to each program.

The 8PSK2/3 modulation system is adopted for the upper layer information transmission, and the BPSK1/2 modulation system is adopted for the lower layer information transmission. Although the BPSK1/2 modulation system cannot assure high quality image display due to its slow transmission rate, the modulation system enables to maintain a lowest viewable receiving quality until the receiving C/N ratio becomes substantially 0 dB.

The receiver is configured to switch over signal receiving between the upper layer information and the lower layer information which are simultaneously transmitted from a broadcasting satellite, depending on the receiving C/N ratio, for allowing viewers to watch a program based on the upper layer information or the lower layer information. Specifically, if the receiving C/N ratio is 9.5 dB or more, the receiver receives the upper layer information that has been modulated according to the 8PSK2/3 modulation system, and decodes the modulated signals for allowing the viewers to watch the program based on the upper layer information. On the other hand, if the receiving C/N ratio falls below about 9.5 dB, the receiver stops receiving the upper layer information and starts receiving the lower layer information that has been modulated according to the BPSK1/2 modulation system and decodes the modulated signals for allowing the viewers to watch the program based on the lower layer information.

Japanese Unexamined Patent Publication No. 2002-009854 discloses a receiver adaptive to the hierarchical modulation service, as an example of the conventional BS digital TV receiver for receiving the upper layer information and the lower layer information. FIG. 8 is a block diagram showing primary components of the BS digital TV receiver.

As shown in FIG. 8, a broadcast stream BCS including waves modulated in channels BS1 through BS15 is received by an antenna (not shown), a channel is selected from among the channels BS1 through BS15 by a tuner 912, and the transport stream (TS) is packetized by a demodulator/decoder 914. A transport stream packet (TSP) processor 918 selects service packets from the transport stream packets, and separates video data packets from audio data packets. A video decoder 922 (including an MPEG decoder) receives the video data packets selected by the TSP processor 918 and a D/A converter 924 outputs a video output signal VS. Likewise, an audio decoder 923 receives the audio data packets selected by the TSP processor 918 and a D/A converter 925 outputs an audio output signal AS.

In the BS digital broadcasting, there is a case that a conditional access system is adopted. According to the conditional access system, specific users who have contracted to pay the receiving fee are authorized to watch a certain program or programs. In such a case, the broadcast stream BCS includes scrambled broadcast program data and specific information (including a key to decrypt the scrambled data). A controller 916 is connected to an IC card circuit or a like device for processing the specific information carried by the received broadcast stream BCS.

Data representing the output error rate of the upper layer information and the output error rate of the lower layer information are detected by the demodulator/decoder 914, and the controller 916 constantly monitors the respective values of the data (e.g., every 10 ms). Information regarding judgment as to whether the hierarchical modulation service is carried out is recorded in a program map table (PMT) defined by MPEG. The TSP processor 918 notifies the controller 916 of the PMT in decoding of the PMT.

The demodulator/decoder 914 has a demodulation circuit, a Viterbi error correction circuit, and a Reed-Solomon error correction circuit. The demodulation circuit demodulates a modulated digital signal whose frequency has been converted by the tuner 912 to a base band signal. After the Viterbi error correction circuit and the Reed-Solomon error correction circuit respectively implement their error corrections with respect to the base band signal demodulated by the demodulation circuit, the signal is decoded and outputted to the TSP processor 918.

The bit error rate (hereinafter, simply called as "BER") of the data is detectable by the demodulation circuit, the Viterbi error correction circuit, and the Reed-Solomon error correction circuit. For instance, if the BER detected by the demodulation circuit is 0.01, the BER detected by the Viterbi error correction circuit is 0.0001, and the BER detected by the Reed-Solomon error correction circuit is 0.00000001. Thus, the bit error rate decreases as the error correction is implemented by the demodulation circuit, the Viterbi error correction circuit, and the Reed-Solomon error correction circuit successively in this order.

The finally obtained bit error rate is sent from the demodulator/decoder 914 to the controller 916, which, in turn, selects the upper layer information or the lower layer information based on the bit error rate, and notifies the TSP processor 918 of the selection result. The TSP processor 918 selects video/audio data packets of the upper layer information, or video/audio data packets of the lower layer information, based on the notification sent from the controller 916, and sends the selected video data packets to the video decoder 922 and the selected audio data packets to the audio decoder 923, respectively. Thus, even in a case where the receiving signal level is lowered due to rainfall or other reason, at least the lower layer information is receivable for allowing viewers to watch a program based on the lower layer information.

In the above prior art technology, since switching between the upper layer information and the lower layer information is implemented based on a judgment as to whether the received signal level is below or above the predetermined level, a low-quality image based on the lower layer information is resultantly displayed on the entirety of a TV screen, despite the fact that all the image data constituting the entirety of the screen image are not necessarily in a error condition.

Further, it is a general practice to apply a so-called hysteresis to a switching operation between the upper-layer-information-based image display and the lower-layer-information-based image display in order to prevent generation of flicker on an on-screen image arising from frequent switchover between the upper-layer-information-based image display and the lower-layer-information-based image display.

This is a function of keeping the upper-layer-information-based image display from being resumed as long as the receiving signal level is not recovered to a predetermined desirable level, once the switchover from the upper-layer-information-based image display to the lower-layer-information-based image display has been done.

Providing the above function makes it possible to prevent generation of flicker on an on-screen image arising from frequent switchover between the upper-layer-information-based image display and the lower-layer-information-based image display. However, in the above arrangement, viewers are forced to watch a program of a low-quality image for a long time despite a possibility that the upper layer information may be receivable during the low-quality image display period.

DISCLOSURE OF THE INVENTION

An object of the present invention is to provide a broadcast receiving apparatus that enables to generate video of a high quality by utilizing a properly received part of a second broadcast signal corresponding to a part of a first broadcast signal which has not been received properly, even if the first broadcast signal has not been received partially properly.

An aspect of the present invention is directed to a broadcast receiving apparatus comprising: receiving means for receiving a first TV broadcast signal and a second TV broadcast signal; first decoding means for decoding the first TV broadcast signal received by the receiving means; second decoding means for decoding the second TV broadcast signal received by the receiving means; detecting means for detecting a decoding error part of the first TV broadcast signal decoded by the first decoding means; and synthesizing means for generating a composite signal obtained by replacing the decoding error part of the first TV broadcast signal detected by the detecting means with a corresponding part of the second TV broadcast signal decoded by the second decoding means.

In the above broadcast receiving apparatus, the first and second TV broadcast signals are received, and the received first and second TV broadcast signals are decoded respectively. At the time of the decoding, the decoding error part of the decoded first TV broadcast signal is detected, and the composite signal is generated by replacing the detected decoding error part of the first TV broadcast signal with the corresponding part of the decoded second TV broadcast signal. In this arrangement, video can be synthesized based on the properly received part of the first broadcast signal, and the part of the second broadcast signal corresponding to the error decoding part of the first broadcast signal which has not been received properly. Thus, even if the first broadcast signal has not been received partially properly, video of a high quality can be generated with use of the corresponding part of the second broadcast signal which has been received properly.

DETAILED DESCRIPTION OF THE INVENTION

In the following, preferred embodiments of the present invention are described referring to the accompanying drawings.

First Embodiment

Figure 1:
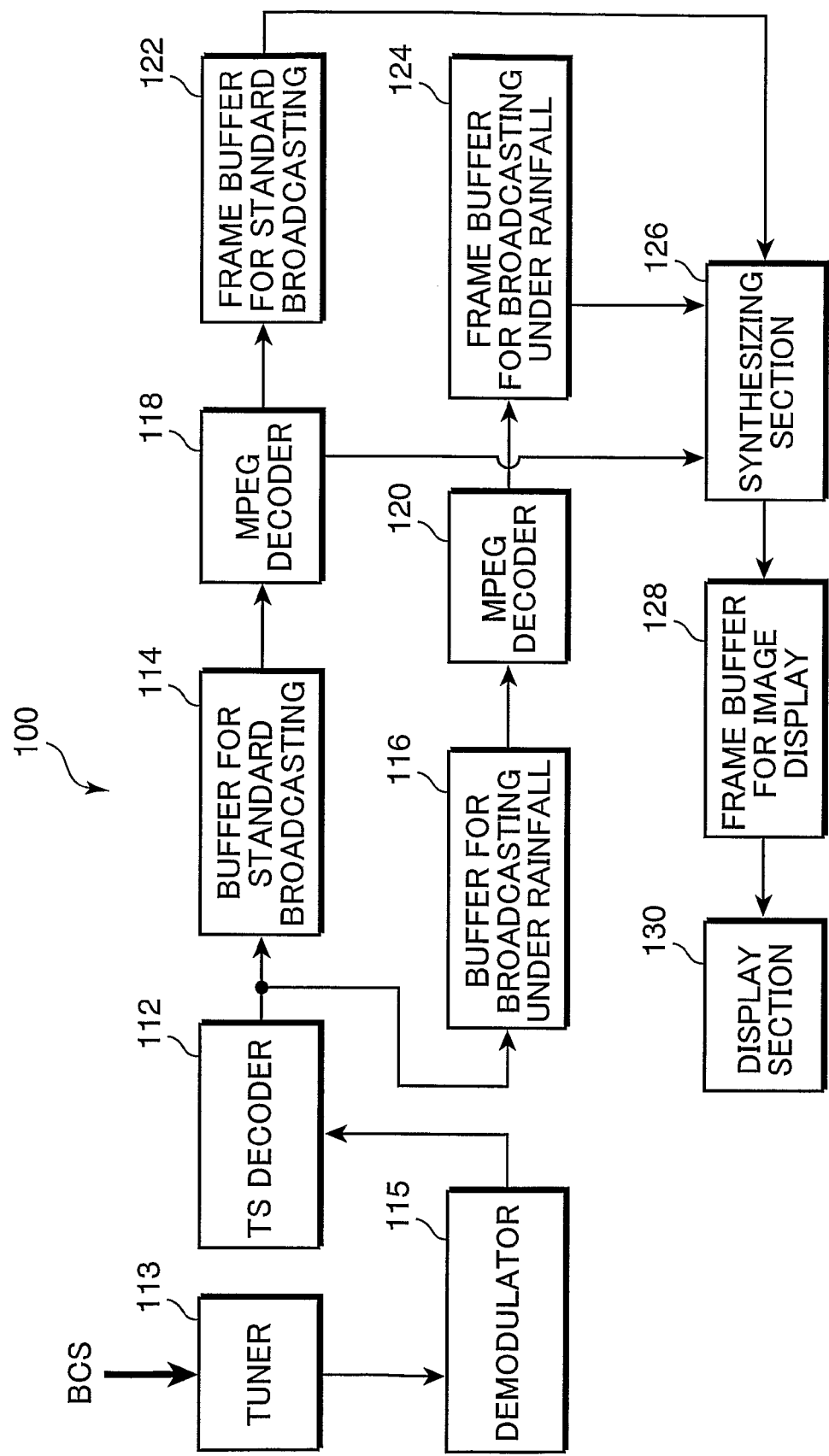
FIG. 1 is a block diagram showing a configuration of primary components of a digital TV broadcast receiving apparatus according to a first embodiment of the present invention.

First, a digital TV broadcast receiving apparatus as a first embodiment of the present invention is described. FIG. 1 is a block diagram showing a configuration of primary components of the digital TV broadcast receiving apparatus as the first embodiment of the present invention.

Referring to FIG. 1, the digital TV broadcast receiving apparatus 100 has a tuner 113, a transport stream (TS) decoder 112, a buffer 114 for standard broadcasting, a buffer 116 for broadcasting under rainfall, an MPEG decoder 118 for standard broadcasting, an MPEG decoder 120 for broadcasting under rainfall, a frame buffer 122 for standard broadcasting, a frame buffer 124 for broadcasting under rainfall, a synthesizing section 126, a frame buffer 128 for image display, and a display section 130. It should be noted that the configuration of the digital TV broadcast receiving apparatus is not limited to the example as illustrated in FIG. 1, wherein each block is constituted of a dedicated circuit, and various modifications and alterations are applicable, wherein each block is constituted of a microcomputer, a peripheral LSI, or a like device.

A broadcast stream BCS which has been broadcasted from a broadcast station and received by an antenna (not shown) is inputted to the tuner 113, which, in turn, selects a predetermined channel. The broadcast stream BCS includes video data for standard broadcasting, which is high-quality video data capable of reproducing high-quality video, and data for broadcasting under rainfall, which is low-quality video data capable of reproducing viewable video even in a weak receiving condition such as rainfall.

A signal of the selected channel is sent to a demodulator 115 for demodulation. Since the processes mentioned above are the same as those of the conventional BS digital TV broadcast receiver, detailed description thereof is omitted herein.

The demodulated signal is inputted to the TS decoder 112 for decoding. After the decoding by the TS decoder 112, the decoded video data packets are classified into video data packets for standard broadcasting, and video data packets for broadcasting under rainfall to be temporarily stored in the buffer 114 for standard broadcasting and the buffer 116 for broadcasting under rainfall, respectively.

The video data packets stored in the buffer 114 for standard broadcasting, and the video data packets stored in the buffer 116 for broadcasting under rainfall are respectively sent to the MPEG decoder 118 and the MPEG decoder 120 for decoding. After the decoding by the MPEG decoder 118 and the MPEG decoder 120, the video data packets are stored in the frame buffer 122 for standard broadcasting, and in the frame buffer 124 for broadcasting under rainfall, respectively.

In decoding each of the video data packets for standard broadcasting, the MPEG decoder 118 detects whether an error has occurred during the decoding of the video data packets due to failure of smooth broadcast stream receiving or other reason, and outputs decoding error information to the synthesizing section 126. For instance, the MPEG decoder 118 creates an error information table as the decoding error information with respect to each frame, and notifies the synthesizing section 126 of the error information table and a presentation time stamp (PTS) attached to the frame, with respect to each frame.

The error information table includes error information in a possible minimum unit detectable by the MPEG decoder 118. The error information is stored in the error information table in such a simplified manner that the numeral 1 is stored if there is an error, and the numeral 0 is stored if there is no error. For instance, in the case where the MPEG decoder 118 is capable of detecting an error in the unit of a macro block, the error information table is composed of table data of 45 bits× 30 bits, assuming that the resolution of video for standard broadcasting consists of 720 pixels×480 pixels.

Specifically, in the case where a Start Code detection error, a syntax error, or a like error is detected during decoding of a picture layer, the MPEG decoder 118 sets all the bits in the error information table to 1. In the case where a Start Code detection error, a syntax error, or a like error is detected during decoding of a slice layer, the MPEG decoder 118 sets all the bits in the corresponding slice row of the error information table where the error has been detected to 1.

Further, in the case where a variable length decode (VLD) error is detected during decoding of data in a region smaller than the macro block, the MPEG decoder 118 sets all the bits in the corresponding slice row of the error information table where the error has been detected to 1. In the case where an out-of-range MV (Motion Vector), a DCT coefficient abnormality, or a like abnormality is detected during decoding of data in a region smaller than the macro block, the MPEG decoder 118 set the bit in the corresponding macro block where the error has been detected to 1.

The error detection process is not limited to the above, and various modifications are applicable. It is possible to adopt a method of using out-of-range brightness information of a component signal, specifically, a method of detecting whether the brightness signal (Y) of 4:2:2-sample format according to CCIR-REC601 is out of the standard range from 16 to 255, or a like technique.

In this embodiment, the MPEG decoder 118 decodes a video data packet for standard broadcasting and detects a decoding error during the decoding. Alternatively, a decoding error detection circuit may be provided independently of an MPEG decoder to cause the MPEG decoder to decode a video data packet for standard broadcasting, and to cause the decoding error detection circuit to detect a decoding error for outputting decoding error information to the synthesizing section 126.

The video data stored in the frame buffer 122 for standard broadcasting, and the video data stored in the frame buffer 124 for broadcasting under rainfall are read out therefrom respectively in synchronism with each other for outputting to the synthesizing section 126.

The synthesizing section 126 specifies the position in the frame buffer 122 where the decoding error has been detected, based on the error information table, specifies the position in the frame buffer 124 corresponding to the decoding error detected position in the frame buffer 122, based on the PTS at the same time when the decoding error has been detected, and replaces the image data at the decoding error detected position in the frame buffer 122 with the image data at the corresponding position in the frame buffer 124 to output the replaced image data to the frame buffer 128 for image display. In the case where the resolution of the video data for standard broadcasting, and the resolution of video data for broadcasting under rainfall are different from each other when the above process is implemented, the synthesizing section 126 implements data expansion or contraction depending on the resolution ratio of the video data for standard broadcasting to the video data for broadcasting under rainfall, and outputs the image data after the data expansion or contraction to the frame buffer 128 for image display.

Figure 2:
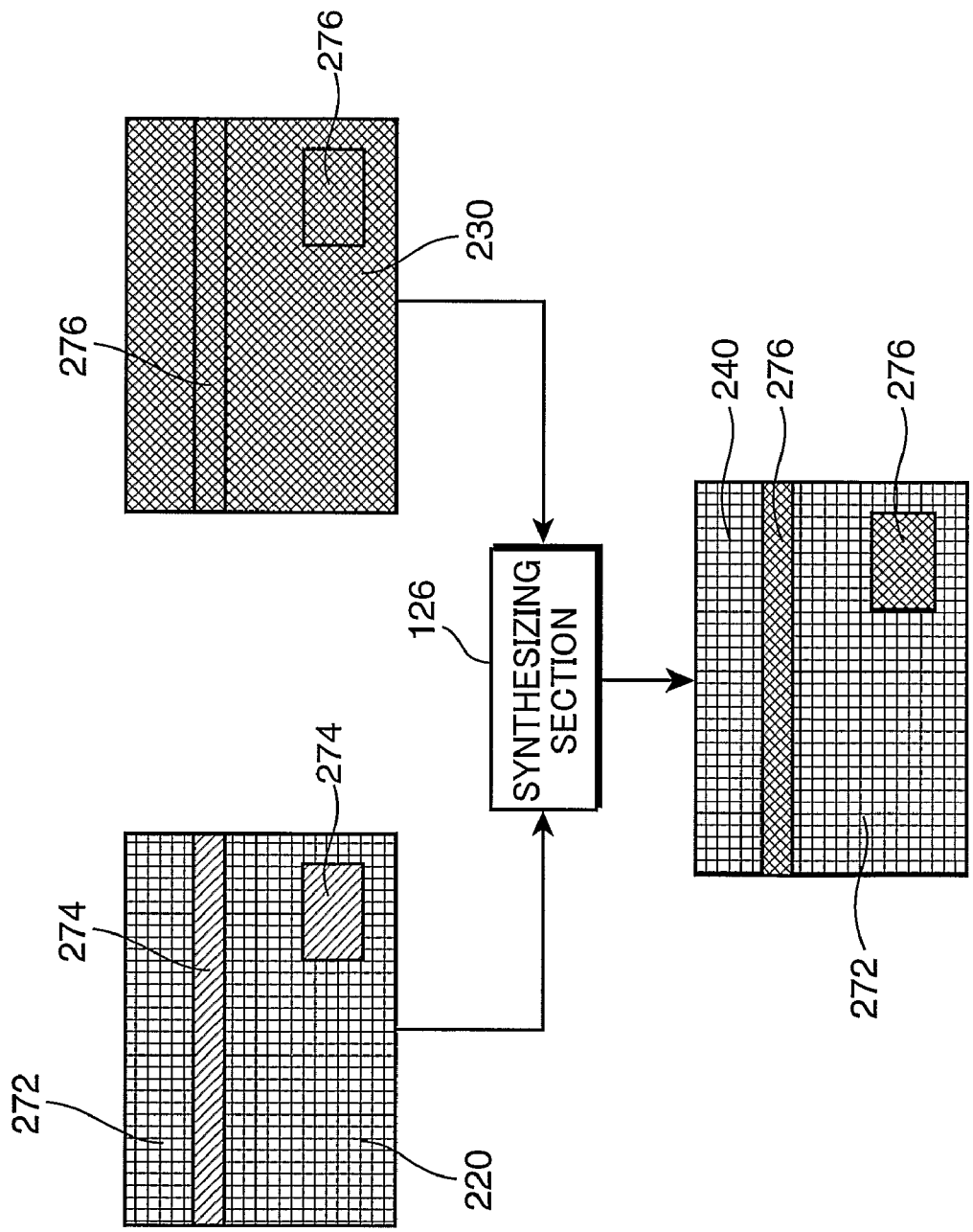
FIG. 2 is an illustration for explaining a process as to how video data is synthesized for displaying on a screen of the digital TV broadcast receiving apparatus shown in FIG. 1.

Now, an exemplified process for synthesizing the video data for standard broadcasting and the video data for broadcasting under rainfall is described referring to FIG. 2.

As shown in FIG. 2, the synthesizing section 126 receives video data 220 for standard broadcasting from the frame buffer 122 for standard broadcasting, and video data 230 for broadcasting under rainfall from the frame buffer 124 for broadcasting under rainfall. Further, the synthesizing section 126 receives the decoding error information concerning the video data 220 from the MPEG decoder 118. The synthesizing section 126 distinguishes between a normal received data region 272 and an abnormal received data region 274 based on the decoding error information.

Next, the synthesizing section 126 extracts a region 276 corresponding to the abnormal received data region 274 of the video data 220, from the video data 230 sent from the frame buffer 124 for broadcasting under rainfall.

Then, the synthesizing section 126 creates video data 240 based on the normal received data region 272 in the video data 220, and the extracted region 276 in the video data 230, which corresponds to the abnormal received data region 274 in the video data 220. After implementing the synthesis, it is possible to use a filter such as block noise reduction (BNR), mosquito noise reduction (MNR), or three-dimensional noise reduction (3DNR) to eliminate or suppress incongruity on or around the synthesized boundary region.

As shown in FIG. 1, the synthesized video data 240 is sent from the synthesizing section 126 to the display section 130 via the frame buffer 128 for image display, so that video corresponding to the video data 240 is displayed on the display section 130, and viewers can watch the video on the TV screen. In this embodiment, since audio data has no direct relevancy to the features of the present invention, description thereof is omitted.

As described above, the video data 240 is created by exclusively utilizing the region 276 in the video data 230 for broadcasting under rainfall which corresponds to the abnormal received data region 274 in the video data 220 for standard broadcasting in terms of a TV screen, while maximally utilizing the normal received data region 272 in the video data 220 for standard broadcasting. This arrangement enables to reproduce highest possible video based on the received video information, so that viewers can watch the highest possible video. Thus, even in an occasion that normal digital TV broadcast receiving is difficult or impossible due to rainfall or other reason, images of a highest possible quality within the range of the received data can be displayed while maximally utilizing the received video information, not to mention simply switching over to receiving video data for broadcasting under rainfall.

Second Embodiment

Figure 3:
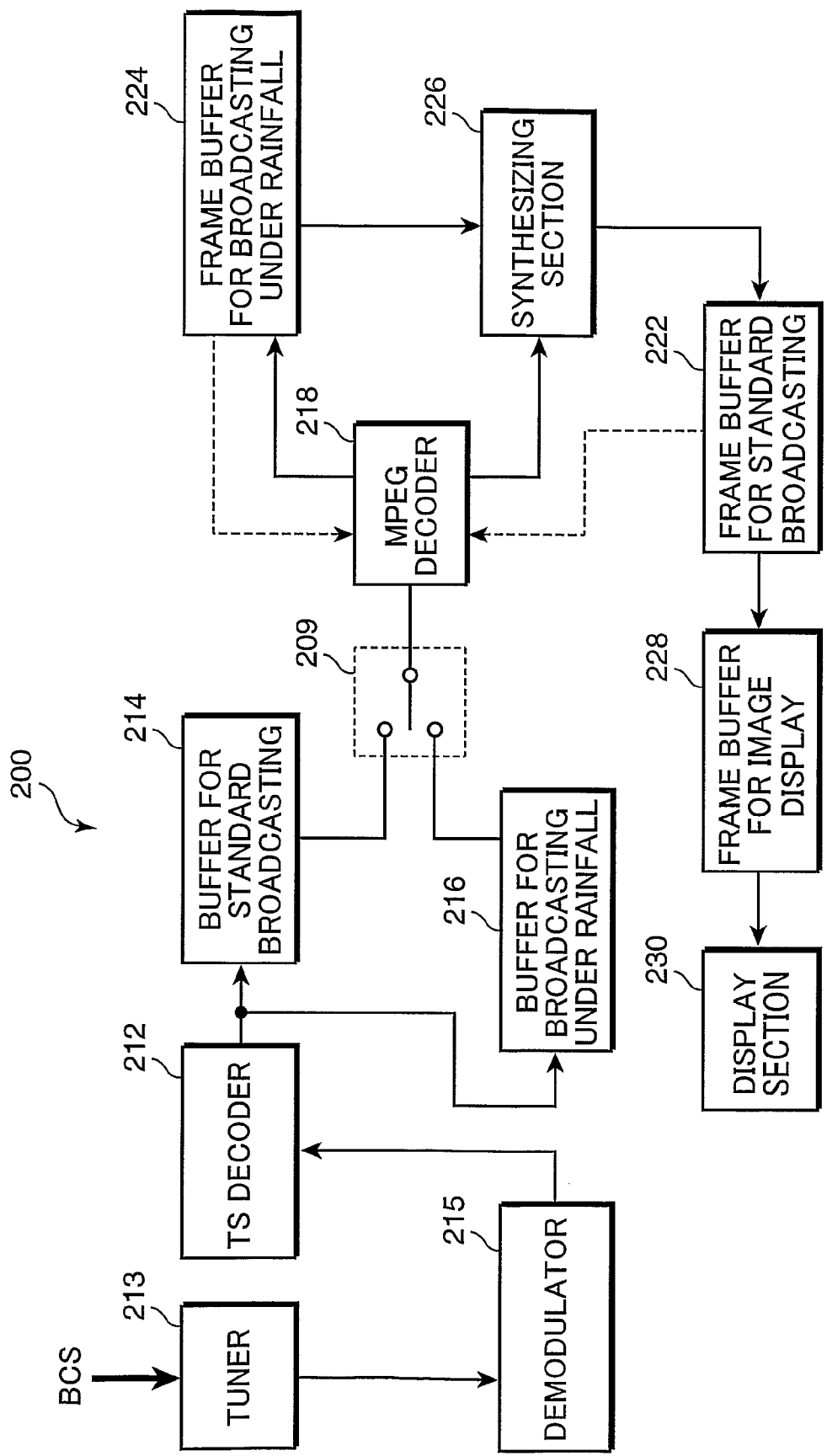
FIG. 3 is a block diagram showing a configuration of primary components of a digital TV broadcast receiving apparatus according to a second embodiment of the present invention.

Next, a digital TV broadcast receiving apparatus as a second embodiment of the present invention is described. FIG. 3 is a block diagram showing a configuration of primary components of the digital TV broadcast receiving apparatus as the second embodiment of the present invention. The digital TV broadcast receiving apparatus 200 shown in FIG. 3 has a switch 209, a tuner 213, a TS decoder 212, a buffer 214 for standard broadcasting, a buffer 216 for broadcasting under rainfall, an MPEG decoder 218, a frame buffer 222 for standard broadcasting, a frame buffer 224 for broadcasting under rainfall, a synthesizing section 226, a frame buffer 228 for image display, and a display section 230.

A broadcast stream BCS which has been broadcasted from a broadcast station and received by an antenna (not shown) is inputted to the tuner 213, which, in turn, selects a predetermined channel. A signal of the selected channel is sent to a demodulator 215 for demodulation. The demodulated signal is inputted to the TS decoder 212 for decoding. After the decoding by the TS decoder 212, the decoded video data packets are classified into video data packets for standard broadcasting, and video data packets for broadcasting under rainfall to be temporarily stored in the buffer 214 for standard broadcasting and in the buffer 216 for broadcasting under rainfall, respectively. Since the processes mentioned above are the same as those of the digital TV broadcast receiving apparatus as the first embodiment, detailed description thereof is omitted herein.

The video data packets stored in the buffer 214 for standard broadcasting, and the video data packets stored in the buffer 216 for broadcasting under rainfall are sent to the MPEG decoder 218 via the switch 209 for individual decoding.

Specifically, since the video data packets for standard broadcasting, and the video data packets for broadcasting under rainfall are carried in time-series in the transport stream (TS) decoded by the TS decoder 212, the video data packets for standard broadcasting, and the video data packets for broadcasting under rainfall are individually read out from the buffer 214 for standard broadcasting and from the buffer 216 for broadcasting under rainfall by switching operation of the switch 209. The MPEG decoder 218 decodes each of the video data packets for standard broadcasting, and each of the video data packets for broadcasting under rainfall on real-time basis.

Similarly to the first embodiment, while the MPEG decoder 218 decodes the video data packets for standard broadcasting, there may be a case that a decoding error occurs in the video data packet due to failure of smooth broadcast stream receiving or other reason.

Similarly to the first embodiment, the MPEG decoder 218 detects such a decoding error, and outputs decoding error information to the synthesizing section 226, so that the decoding error information is utilized for synthesizing video data based on the video data for standard broadcasting and the video data for broadcasting under rainfall, which will be described later. Further, since an error detecting process to be implemented by the MPEG decoder 218 is substantially the same as that in the first embodiment, detailed description thereof is omitted herein.

In this embodiment, if the MPEG decoder 218 has detected a decoding error, image information for broadcasting under rainfall, which corresponds to image information for standard broadcasting where the decoding error has been detected, is read out from the frame buffer 224 for broadcasting under rainfall, and the readout image information is used in decoding of next image information. This is because use of the image information in which the decoding error has been detected for decoding of the next image information may degrade the decoded image.

The above arrangement enables to prevent degradation of the next image information by decoding, because the image information in which the decoding error has been detected is not used for decoding of the next image information.

More specifically, the video data for standard broadcasting which has been decoded by the MPEG decoder 218 is sent to the synthesizing section 226 along with the decoding error information. The video data for broadcasting under rainfall which has been decoded by the MPEG decoder 218 is read out from the frame buffer 224 for broadcasting under rainfall, and is outputted to the synthesizing section 226 in synchronism with the transmission of the decoded video data for standard broadcasting and the decoding error information.

Now, an operation of the synthesizing section 226 is described in detail referring to FIG. 2. The synthesizing section 226 distinguishes between a normal received data region 272 and an abnormal received data region 274, based on the decoding error information. Then, the synthesizing section 226 extracts a region 276 corresponding to the abnormal received data region 274 in the video data 220, from the video data 230 sent from the frame buffer 224 for broadcasting under rainfall.

Then, the synthesizing section 226 creates video data 240 based on the normal received data region 272 in the video data 220 for standard broadcasting, and the extracted region 276 in the video data 230 for broadcasting under rainfall, which corresponds to the abnormal received data region 274 in the video data 220. The synthesizing section 226 stores the video data 240 in the frame buffer 222 for standard broadcasting.

Now, the processes in the MPEG decoder 218 and the synthesizing section 226 are described in detail. The MPEG decoder 218 alternately decodes the video data packet for standard broadcasting and the video data packet for broadcasting under rainfall frame after frame. More specifically, the MPEG decoder 218 alternately decodes the video data packet for broadcasting under rainfall, and the video data packet for standard broadcasting in this order with respect to frames having PTS identical to each other. However, the MPEG decoder 218 decodes the video data packet for broadcasting under rainfall several frames ahead of the decoding of the video data packet for standard broadcasting by setting the capacity of the frame buffer 224 larger than the capacity of a frame buffer to be used in ordinary decoding, considering likelihood that picture structures of frames having the identical PTS may be different from each other between the video data packet for standard broadcasting, and the video data packet for broadcasting under rainfall. This arrangement enables to securely decode the video data packet for broadcasting under rainfall having a picture structure different from that of the video data packet for standard broadcasting.

The MPEG decoder 218 decodes the video data packet for broadcasting under rainfall while referring to the frame buffer 224 for broadcasting under rainfall. Since the decoding process by the MPEG decoder 218 is the same as the decoding process of an ordinary video data packet, detailed description thereof is omitted herein.

The MPEG decoder 218 decodes the video data packet for standard broadcasting while referring to the frame buffer 222 for standard broadcasting, and writes the decoding result into the frame buffer 222 for standard broadcasting via the synthesizing section 226. The communication between the MPEG decoder 218 and the synthesizing section 226 is conducted each time a layer in a picture is decoded by the MPEG decoder 218, in place of decoding in the unit of a picture. A process for detecting a decoding error in each layer to be implemented by the MPEG decoder 218 is the same as that in the first embodiment, and accordingly, detailed description thereof is omitted herein.

Figure 4:
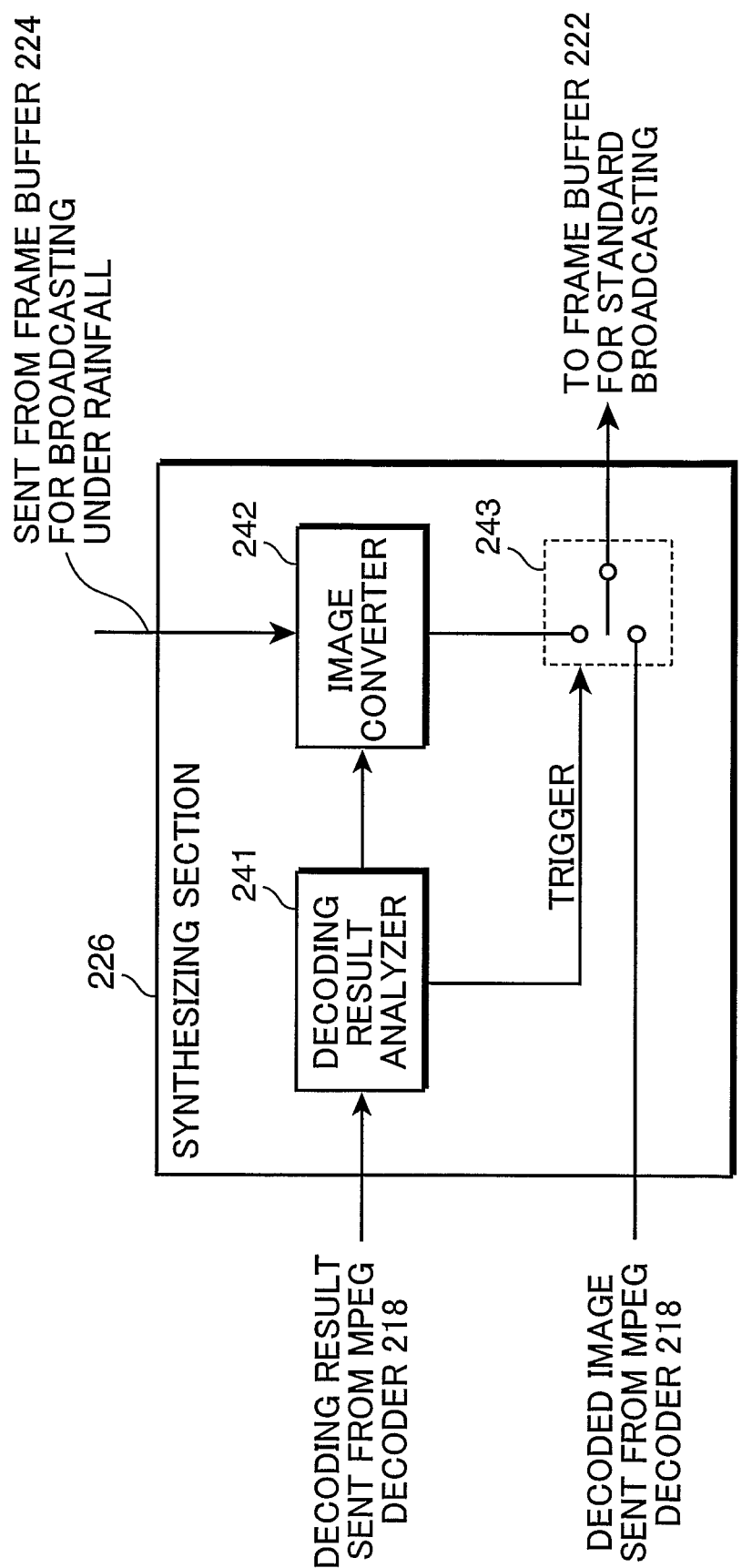
FIG. 4 is a block diagram showing an arrangement of a synthesizing section shown in FIG. 3.

FIG. 4 is a block diagram showing an arrangement of the synthesizing section 226 shown in FIG. 3. The synthesizing section 226 includes a decoding result analyzer 241, an image converter 242, and a switch 243. The decoding result analyzer 241 analyzes the decoding result outputted from the MPEG decoder 218, and controls the image converter 242 and the switch 243 depending on the decoding result.

After decoding of the picture layer, the MPEG decoder 218 outputs the decoding result to the synthesizing section 226 along with the PTS attached to the picture. The synthesizing section 226 secures a region corresponding to the frame data in the frame buffer 222, and checks a region in the frame buffer 224 corresponding to the picture. The decoding result analyzer 241 of the synthesizing section 226 analyzes the decoding result. If it is judged that the decoding result does not include a decoding error, the synthesizing section 226 is put in an inactive status.

On the other hand, if it is judged that the decoding result includes a decoding error, the decoding result analyzer 241 controls the image converter 242 to read out the corresponding frame data from the frame buffer 224 for broadcasting under rainfall, and controls the switch 243 to be connected with the image converter 242. The image converter 242 reads out the frame data from the frame buffer 224, implements data expansion or contraction depending on the resolution ratio of the video data for standard broadcasting to that for broadcasting under rainfall, and writes the frame data after the data expansion or contraction into the corresponding region in the frame buffer 222 for standard broadcasting via the switch 243.

After the decoding of the slice layer, the MPEG decoder 218 outputs the decoding result to the decoding result analyzer 241, which, in turn, analyzes the decoding result outputted from the MPEG decoder 218. If it is judged that the decoding result does not include a decoding error, the synthesizing section 226 is put in an inactive status.

On the other hand, if it is judged that the decoding result includes a decoding error, the decoding result analyzer 241 controls the image converter 242 to read out the corresponding slice data from the frame buffer 224 for broadcasting under rainfall, and controls the switch 243 to be connected with the image converter 242. The image converter 242 reads out the slice data from the frame buffer 224, implements data expansion or contraction depending on the resolution ratio, and writes the slice data after the data expansion or contraction into the corresponding region in the frame buffer 222 for standard broadcasting via the switch 243.

After the decoding of the macro block, the MPEG decoder 218 outputs the position of the macro block, macro block data, and the decoding result to the decoding result analyzer 241. The decoding result analyzer 241 analyzes the decoding result outputted from the MPEG decoder 218, controls the switch 243 to be connected with the MPEG decoder 218 if it is judged that the decoding result does not include a decoding error, and writes the macro block data outputted from the MPEG decoder 218 into the corresponding region in the frame buffer 222 for standard broadcasting.

On the other hand, if it is judged that the decoding result includes a decoding error, the decoding result analyzer 241 controls the image converter 242 to read out the corresponding macro block data from the frame buffer 224 for broadcasting under rainfall, and controls the switch 243 to be connected with the image converter 242. The image converter 242 reads out the macro block data from the frame buffer 224 for broadcasting under rainfall, implements data expansion or contraction depending on the resolution ratio, and writes the macro block data after the data expansion or contraction into the corresponding region in the frame buffer 222 for standard broadcasting via the switch 243.

Then, the video data written in the frame buffer 222 is written in the frame buffer 228 for image display, and the synthesized video data is sent to the display section 230 via the frame buffer 228, so that video corresponding to the synthesized video data is displayed on the display section 230, and viewers can watch the video on a TV screen.

The above arrangement makes it possible to store error-free video data in the frame buffer 222 for standard broadcasting by causing the synthesizing section 226 to implement data synthesis simultaneously with detection of a decoding error even if the decoding error has been detected during decoding of the video data packet for standard broadcasting. This arrangement enables to prevent a decoding error in a previous decoding process from being propagated in a next decoding process, because there is no likelihood that image information having deficient data due to a decoding error in the previous decoding process may be referred to in the next decoding process.

As mentioned above, in this embodiment, since the MPEG decoder 218 decodes the video data packet for standard broadcasting and the video data packet for broadcasting under rainfall on real-time basis by switching operation of the switch 209, the video data packet for standard broadcasting and the video data packet for broadcasting under rainfall can be decoded by the single MPEG decoder 218, while securing substantially the same effects as in the first embodiment.

In this embodiment, if the MPEG decoder 218 has detected a decoding error, the MPEG decoder 218 reads out the image information in the video data for broadcasting under rainfall, which corresponds to the image information where the decoding error has been detected, from the frame buffer 224 for broadcasting under rainfall to use the readout image information for decoding of the next image information, because use of the image information where the decoding error has been detected in decoding of the next image information may degrade the decoded image. This arrangement enables to prevent degradation of the next image information by decoding, because there is no likelihood that the image information where the decoding error has been detected is used in decoding of the next image information.

Third Embodiment

Figure 5:
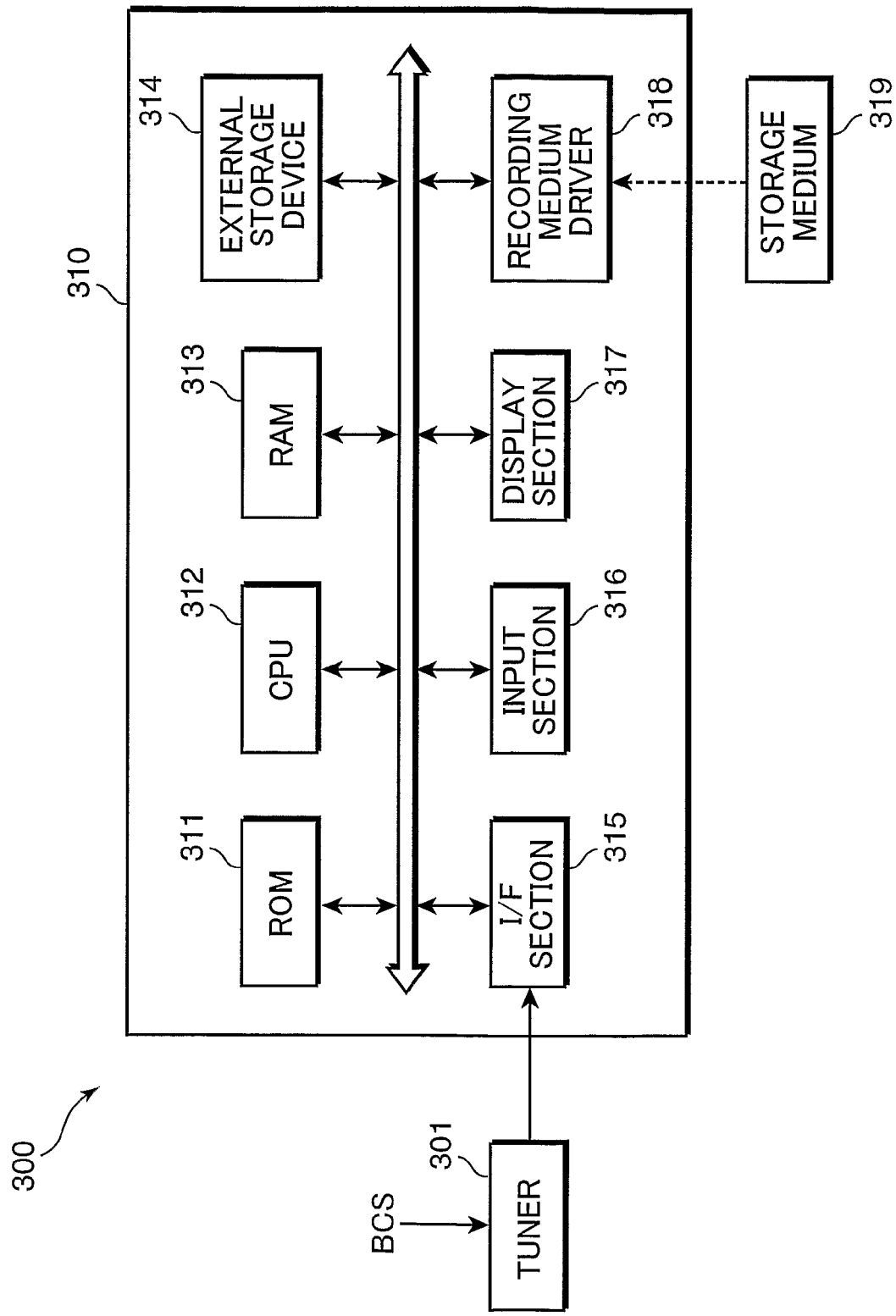
FIG. 5 is a block diagram showing a configuration of primary components of a digital TV broadcast receiving apparatus according to a third embodiment of the present invention.

Next, a digital TV broadcast receiving apparatus as a third embodiment of the present invention is described. The third embodiment is adapted to realize a broadcast receiving process to be implemented by the digital TV broadcast receiving apparatus as the first embodiment with use of a software. FIG. 5 is a block diagram showing primary components of the digital TV broadcast receiving apparatus as the third embodiment of the present invention.

Referring to FIG. 5, the digital TV broadcast receiving apparatus 300 comprises a tuner 301 and a computer 310. The computer 310 includes a read only memory (ROM) 311, a central processing unit (CPU) 312, a random access memory (RAM) 313, an external storage derive 314, an interface (I/F) section 315, an input section 316, a display section 317, and a recording medium driver 318.

The tuner 301 includes a tuner board. The tuner 301 selects a predetermined channel from a broadcast stream received through an antenna (not shown), and inputs a signal of the predetermined channel to the computer 300 via the I/F section 315.

The computer 310 is an ordinary personal computer made of various blocks. The respective blocks of the computer 310 are connected to an internal bus, so that various data are inputted to or outputted from the respective blocks via the internal bus, and various processes are implemented under the control of the CPU 312.

The I/F section 315 includes a predetermined interface board, and outputs the signal of the channel selected by the tuner 301 to the CPU 312, or a like device. The ROM 311 stores therein a system program such as a basic input/output system (BIOS). The external storage device 314 includes a hard disk driver, and stores therein a predetermined operating system (OS), and a broadcast receiving program, which will be described later.

The CPU 312 reads out the broadcast receiving program from the external storage device 314, executes a broadcast receiving process, which will be described later, and functions as the TS decoder 112, the MPEG decoders 118, 120, and the synthesizing section 126 shown in FIG. 1. The RAM 313 is used as an operating region or a like region for the CPU 312, and functions as the buffer 114 for standard broadcasting, the buffer 116 for broadcasting under rainfall, the frame buffer 122 for standard broadcasting, the frame buffer 124 for broadcasting under rainfall, and the frame buffer 128 for image display.

The input section 316 includes a keyboard, a mouse, and the like, and is used by a user for inputting various instructions on operations. The display section 317 includes a crystal liquid display, and displays high-quality video that has been interpolated based on low-quality video under the control of the CPU 312. The recording medium driver 318 includes a DVD driver.

It is possible to record the broadcast receiving program on a computer-readable recording medium 319 such as a DVD-ROM, to activate the recording medium driver 318 to read out the broadcast receiving program from the recording medium 319, and to install the readout broadcast receiving program in the external storage device 314 for execution of the broadcast receiving program. In the case where the broadcast receiving program is stored in another computer or an equivalent device which has been connected to the digital TV broadcast receiving apparatus 300 shown in FIG. 5 via a predetermined network, it is possible to download the broadcast receiving program from the another computer via the network to execute the broadcast receiving program.

Figure 6:
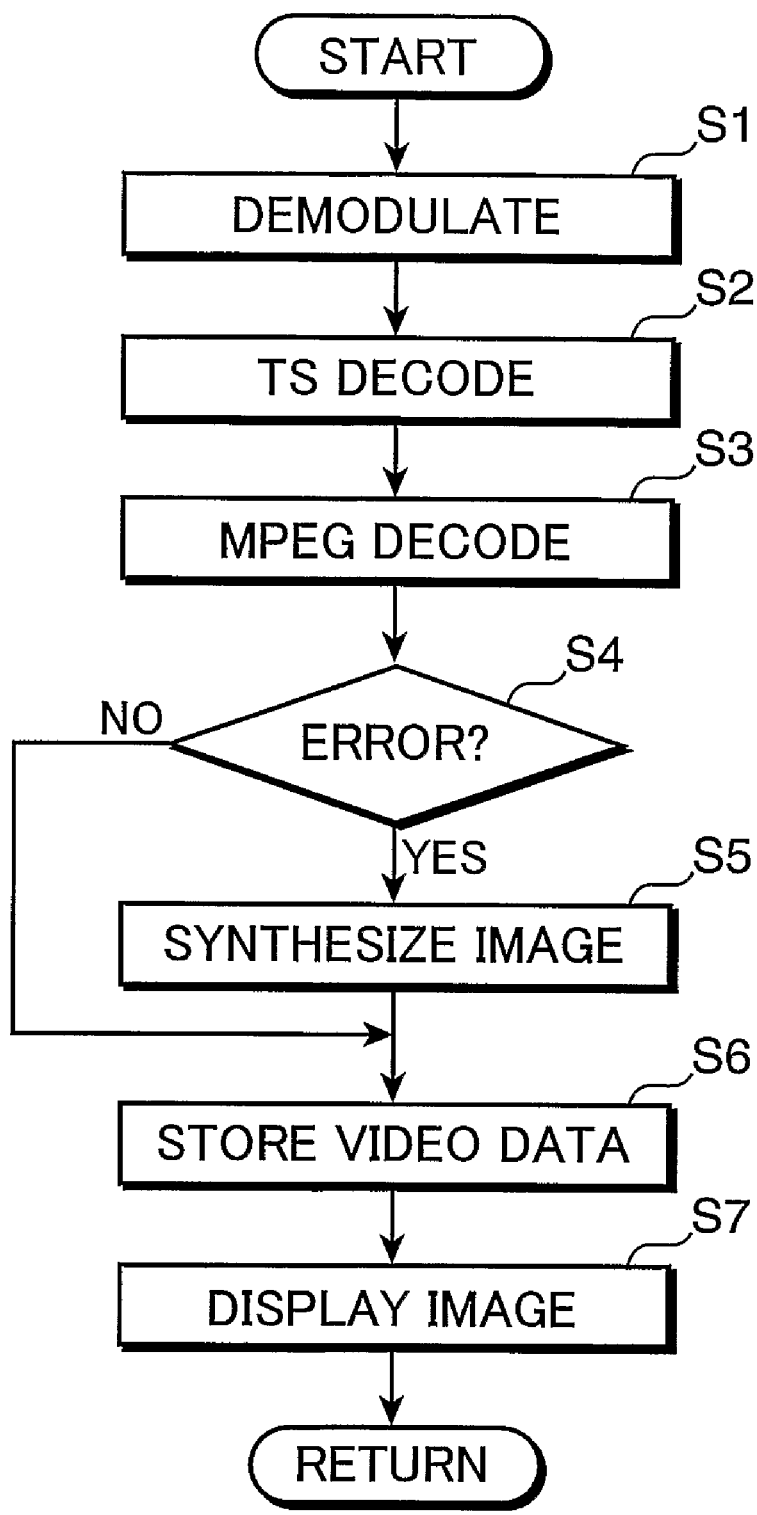
FIG. 6 is a flowchart for explaining an example of a broadcast receiving process to be implemented by the digital TV broadcast receiving apparatus shown in FIG. 5.

Now, the broadcast receiving process to be implemented by the digital TV broadcast receiving apparatus 300 having the above configuration is described. FIG. 6 is a flowchart for explaining the broadcast receiving process to be implemented by the digital TV broadcast receiving apparatus 300 shown in FIG. 5.

First, the CPU 312 executes a demodulation process with respect to the selected signal (Step S1), and generates video data packets for standard broadcasting and video data packets for broadcasting under rainfall by decoding the demodulated signal for temporarily storing the video data packets for standard broadcasting and the video data packets for broadcasting under rainfall in a buffer region for standard broadcasting and in a buffer region for broadcasting under rainfall in the RAM 313, respectively (Step S2).

Then, in Step S3, the CPU 312 reads out the video data packets for standard broadcasting and the video data packets for broadcasting under rainfall from the respective corresponding buffer regions in the RAM 313 for decoding, and stores the decoded video data for standard broadcasting and the decoded video data for broadcasting under rainfall in a frame buffer region for standard broadcasting and in a frame buffer region for broadcasting under rainfall in the RAM 313, respectively.

In Step S4, the CPU 312 judges whether a decoding error has occurred during the decoding process of the video data packets for standard broadcasting in Step S3 due to failure of smooth broadcast stream receiving or other reason, and creates decoding error information. If the decoding error information indicates that there is a decoding error, the routine goes to Step S5. On the other hand, if the decoding error information indicates that there is no decoding error, the routine goes to Step S6.

If the decoding error information indicates that there is a decoding error, in Step S5, the CPU 312 distinguishes between a normal received data region and an abnormal received data region in the video data for standard broadcasting, based on the decoding error information regarding the video data for standard broadcasting. Next, the CPU 312 extracts a part corresponding to the abnormal received data region in the video data for standard broadcasting, from the video data for broadcasting under rainfall which has been stored in the frame buffer region for broadcasting under rainfall in the RAM 313, and creates video data based on the normal received data in the video data for standard broadcasting and the extracted data in the video data for broadcasting under rainfall.

On the other hand, if the decoding error information indicates that there is no decoding error, or the process in Step S5 has been terminated, the CPU 312 stores the synthesized video data in the frame buffer region for image display in the RAM 313 (Step S6), and causes the display section 317 to display video corresponding to the video data stored in the frame buffer region for image display (Step S7).

The above arrangement enables execution of the respective processes by the software, while securing substantially the same effects as in the first embodiment. Thus, the respective processes can be easily modified. For instance, a modified broadcast receiving process to be implemented by the digital TV broadcast receiving apparatus as the second embodiment can be realized by partly changing the broadcast receiving program in the following manner.

In the modification, the CPU 312 functions as the switch 209, the TS decoder 212, the MPEG decoder 218, and the synthesizing section 226 shown in FIG. 3. The RAM 313 functions as the buffer 214 for standard broadcasting, the buffer 216 for broadcasting under rainfall, the frame buffer 222 for standard broadcasting, the frame buffer 224 for broadcasting under rainfall, and the frame buffer 228 for image display shown in FIG. 3.

Figure 7:
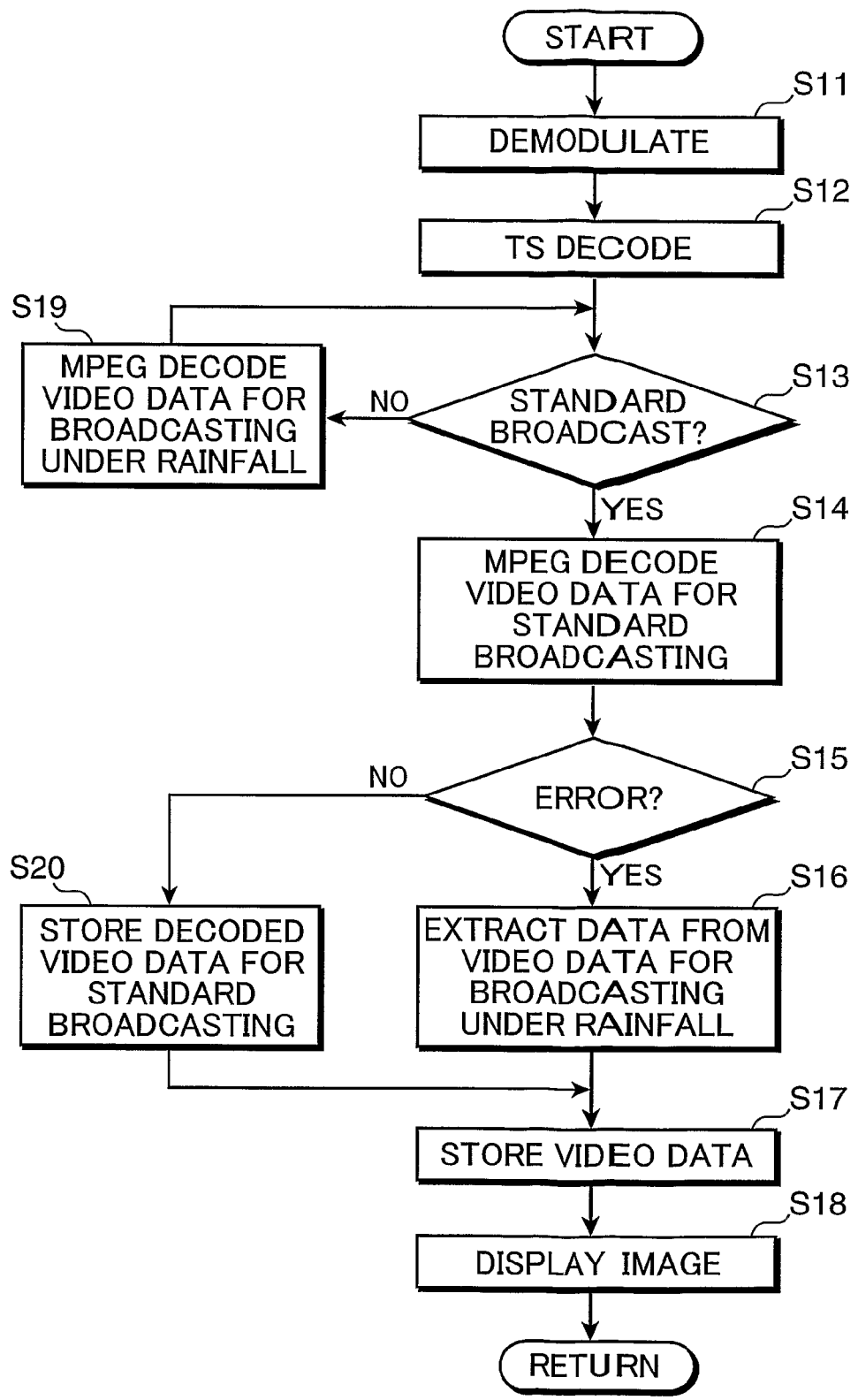
FIG. 7 is a flowchart for explaining an altered example of a broadcast receiving process to be implemented by the digital TV broadcast receiving apparatus shown in FIG. 5.
Figure 8:
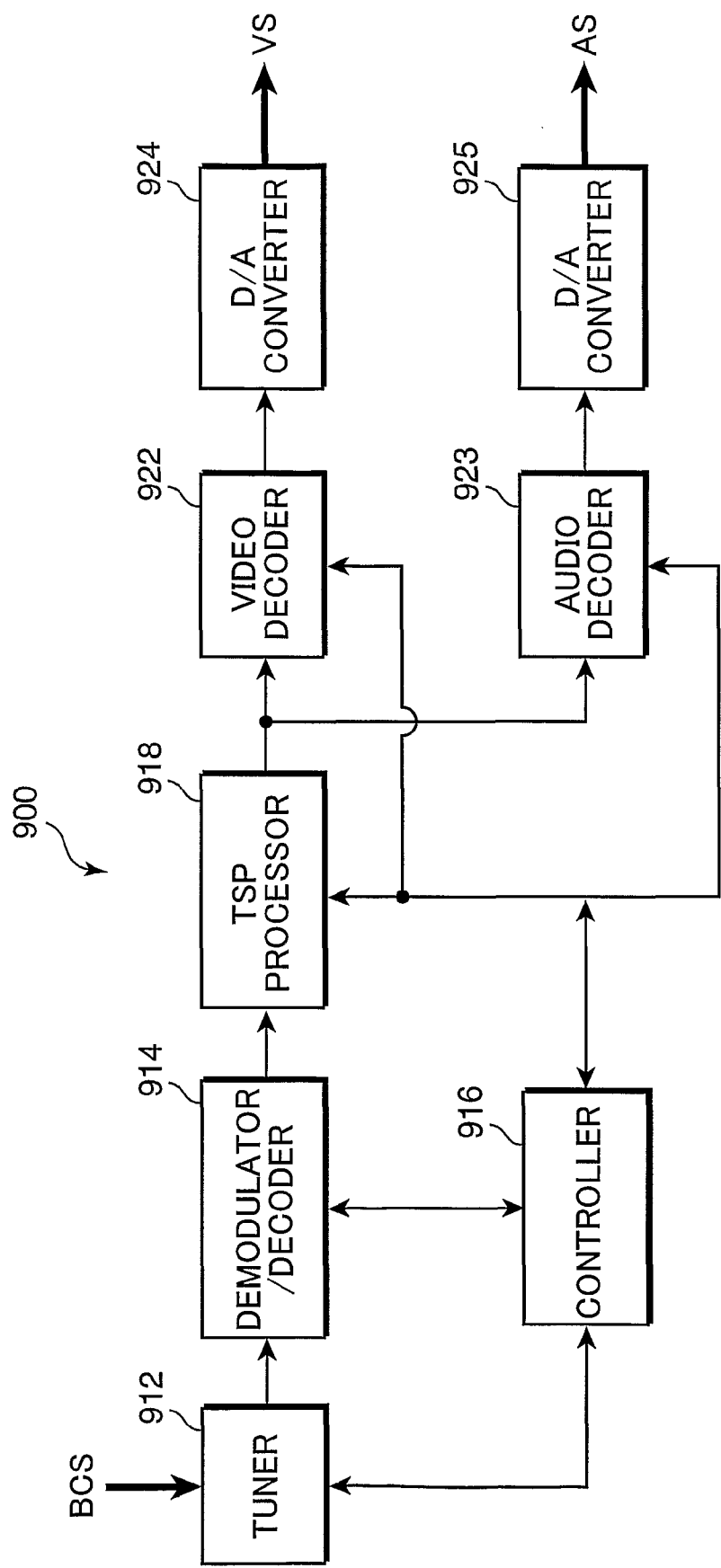
FIG. 8 is block diagram showing primary components of a conventional BS digital TV broadcast receiver.

FIG. 7 is a flowchart for explaining the modified broadcast receiving process to be implemented by the digital TV broadcast receiving apparatus 300 shown in FIG. 5. First, in Steps S11 and S12, processes similar to those in Steps S1 and S2 shown in FIG. 6 are executed. Then, in Step S13, the CPU 312 alternately reads out a video data packet for broadcasting under rainfall and a video data packet for standard broadcasting from a buffer region for broadcasting under rainfall and from a buffer region for standard broadcasting in the RAM 313, respectively. If the video data packet for broadcasting under rainfall is read out, the routing proceeds to Step S19. On the other hand, if the video data packet for standard broadcasting is read out, the routine proceeds to Step S14.

If the video data packet for broadcasting under rainfall is read out, in Step S19, the CPU 312 decodes the video data packet for broadcasting under rainfall while referring to the frame buffer region for broadcasting under rainfall in the RAM 313, and stores the decoded video data for broadcasting under rainfall in the frame buffer region for broadcasting under rainfall in the RAM 313. Then, the routine goes to Step S13 to cyclically repeat the process in Step S13, and thereafter.

On the other hand, if the video data packet for standard broadcasting is read out, in Step S14, the CPU 312 decodes the video data packet for standard broadcasting while referring to the frame buffer region for standard broadcasting in the RAM 313.

Next, in Step S15, the CPU 312 detects whether a decoding error has occurred during the decoding process of the video data packet for standard broadcasting, and creates decoding error information. If the decoding error information indicates that there is a decoding error, the routine goes to Step S16. On the other hand, if the decoding error information indicates that there is no decoding error, the routine goes to Step S20.

If the decoding error information indicates that there is a decoding error, in Step S16, the CPU 312 extracts a part corresponding to the abnormal received data region in the video data for standard broadcasting, from the video data for broadcasting under rainfall which has been stored in the frame buffer region for broadcasting under rainfall in the RAM 313 in terms of a TV screen, based on the decoding error information regarding the video data for standard broadcasting, implements data expansion or contraction depending on the resolution ratio of the video data for standard broadcasting to that for broadcasting under rainfall. Thereafter, the CPU 312 writes the video data after the data expansion or contraction into the corresponding frame buffer region for standard broadcasting in the RAM 313.

On the other hand, if the decoding error information indicates that there is no decoding error, in Step S20, the CPU 312 writes the decoded video data for standard broadcasting into the corresponding frame buffer region for standard broadcasting in the RAM 313.

Thereafter, in Step S17, the CPU 312 stores the video data that has been written in the frame buffer region for standard broadcasting in the RAM 313, into the frame buffer region for image display in the RAM 313. Then, in Step S18, the CPU 312 causes the display section 317 to display video corresponding to the video data stored in the frame buffer region for image display in the RAM 313. Thus, the modified broadcast receiving process to be implemented by the apparatus as the second embodiment can be realized, while securing substantially the same effects as in the foregoing embodiments.

In this embodiment, described is the example as to how the process after the broadcast receiving with the tuner is realized with use of a software. The process to be realized by the software is not limited to the above. It is possible to adopt various modifications and alterations including an arrangement in which a process or processes up to demodulation, or up to TS decoding, or up to MPEG decoding is or are realized by a hardware, and a process or processes thereafter is or are realized by a software.

EXPLOITATION IN INDUSTRY

As mentioned above, according to the present invention, in the case where proper digital TV broadcast receiving is not expected due to rainfall or other reason, video data is synthesized by maximally utilizing the properly received part in video data for standard broadcasting, not to mention switching over to video data for broadcasting under rainfall. The industrial applicability of the present invention is tremendous because users can watch images of a highest possible quality within the received range.

The invention claimed is:
1. A broadcast receiving apparatus, comprising:
a receiver which receives a first TV broadcast signal and a second TV broadcast signal;
a timesharing unit which timeshares the first TV broadcast signal and the second TV broadcast signal received by the receiver for outputting;
a decoder which alternately decodes the first TV broadcast signal and the second TV broadcast signal timeshared by and outputted from the timesharing unit;
a detector which detects a decoding error part of the first TV broadcast signal decoded by the decoder with respect to each frame, and generates a decoding error information, with respect to each frame, including error information and a presentation time stamp attached to the frame;
a synthesizer which specifies the decoding error part of the first TV broadcast signal based on the error information in the decoding error information generated by the detector, specifies a frame of the second TV broadcast signal of which a time is the same as that of the decoding error part based on the presentation time stamp, and generates a composite signal obtained by replacing the decoding error part of the first TV broadcast signal with a corresponding part in the specified frame of the second TV broadcast signal decoded by the decoder;
a first storage device which stores the composite signal outputted from the synthesizer; and
a second storage device which stores the second TV broadcast signal decoded by the decoder,
wherein the decoder decodes the second TV broadcast signal and the first TV broadcast signal in this order with respect to frames having a presentation time stamp identical to each other, and stores, before the detector detects the decoding error part of the first TV broadcast signal, the part of the second TV broadcast signal corresponding to the decoding error part of the first TV broadcast signal in the second storage device, the decoder reads out, when the detector has detected the decoding error part of the first TV broadcast signal, the decoded second TV broadcast signal, which corresponds to the first TV broadcast signal where the decoding error part has been detected, from the second storage device and uses the readout decoded second TV broadcast signal in decoding a next frame of the first TV broadcast signal,
the synthesizer stores the first TV broadcast signal decoded by the decoder in the first storage device if the detector has not detected the decoding error part of the first TV broadcast signal, and reads out the part of the second TV broadcast signal corresponding to the decoding error part from the second storage device and stores the readout part in the first storage device if the detector has detected the decoding error part of the first TV broadcast signal, and
wherein the first TV broadcast signal and the second TV broadcast signal are each a digital TV broadcast signal, and
the first TV broadcast signal has a content identical to a content of the second TV broadcast signal, and is a signal modulated by a modulation system having a viewable receiving C/N ratio higher than a viewable receiving C/N ratio of a modulation system applied to the second TV broadcast signal.

2. The apparatus according to claim 1, wherein the decoder and the detector constitute a decoding and detecting unit which decodes the first TV broadcast signal corresponding to the second TV broadcast signal after decoding the second TV broadcast signal, and detects the decoding error part of the first TV broadcast signal during decoding of the first TV broadcast signal to output a detection result to the synthesizer.

3. The apparatus according to claim 1, wherein the second TV broadcast signal is a broadcast signal for use in broadcasting under rainfall for the first TV broadcast signal.

4. The apparatus according to claim 1, wherein when a resolution of the first TV broadcast signal decoded by the decoder is different from a resolution of the second TV broadcast signal decoded by the decoder, the synthesizer implements data expansion or contraction depending on a resolution ratio of the resolution of the first TV broadcast signal and the resolution of the second TV broadcast signal.

5. The apparatus according to claim 1, wherein the first TV broadcast signal provides a video of a quality higher than a quality of the second TV broadcast signal.

6. A broadcast receiving method, comprising:
receiving a first TV broadcast signal and a second TV broadcast signal;
timesharing and outputting the first TV broadcast signal and the second TV broadcast signal received;
decoding alternately the first TV broadcast signal and the second TV broadcast signal timeshared and outputted;
detecting a decoding error part of the first TV broadcast signal decoded with respect to each frame, generating a decoding error information, with respect to each frame, including error information and a presentation time stamp attached to the frame;
specifying the decoding error part of the first TV broadcast signal based on the error information in the decoding error information generated, specifying a frame of the second TV broadcast signal of which a time is the same as that of the decoding error part based on the presentation time stamp, generating a composite signal obtained by replacing the specified decoding error part of the first TV broadcast signal with a corresponding part in the specified frame of the second TV broadcast signal;
storing the composite signal in a first storage device;
storing the decoded second TV broadcast signal in a second storage device; and
Reading out, when the decoding error part of the first TV broadcast signal has been detected, the decoded second TV broadcast signal, which corresponds to the first TV broadcast signal where the decoding error part has been detected, from the second storage device and using the readout decoded second TV broadcast signal in decoding a next frame of the first TV broadcast signal, wherein
the second TV broadcast signal and the first TV broadcast signal are decoded in this order with respect to frames having a presentation time stamp identical to each other, before the decoding error part of the first TV broadcast signal is detected, the part of the second TV broadcast signal corresponding to the decoding error part of the first TV broadcast signal is stored in the second storage device,
the first TV broadcast signal decoded is stored in the first storage device if the decoding error part of the first TV broadcast signal has not been detected, and the part of the second TV broadcast signal corresponding to the decoding error part is read out from the second storage device and stored in the first storage device if the decoding error part of the first TV broadcast signal has been detected, and wherein the first TV broadcast signal and the second TV broadcast signal are each a digital TV broadcast signal, and the first TV broadcast signal has a content identical to a content of the second TV broadcast signal, and is a signal modulated by a modulation system having a viewable receiving C/N ratio higher than a viewable receiving C/N ratio of a modulation system applied to the second TV broadcast signal.

7. A non-transitory computer-readable storage medium storing a broadcast receiving program in executable form that when executed causes a computer to function as:

timesharing means for timesharing and outputting a first TV broadcast signal and a second TV broadcast signal which have been received;

a decoding means for alternately decoding the first TV broadcast signal and the second TV broadcast signal timeshared and outputted by the timesharing means;

detecting means for detecting a decoding error part of the decoded first TV broadcast signal with respect to each frame, and for generating a decoding error information, with respect to each frame, including error information and a presentation time stamp attached to the frame; and synthesizing means for specifying the decoding error part of the first TV broadcast signal based on the error information in the decoding error information generated by the detecting means, for specifying a frame of the second TV broadcast signal of which a time is the same as that of the decoding error part based on the presentation time stamp, for generating a composite signal obtained by replacing the specified decoding error part of the first TV broadcast signal with a corresponding part in the specified frame of the second TV broadcast signal, and for storing the composite signal in a first storage device, wherein the decoding means stores the decoded second TV broadcast signal in a second storage device, the decoding means decodes the second TV broadcast signal and the first TV broadcast signal in this order with respect to frames having a presentation time stamp identical to each other, and stores, before the detecting means detects the decoding error part of the first TV broadcast signal, the part of the second TV broadcast signal corresponding to the decoding error part of the first TV broadcast signal in the second storage device, the decoding means reads out, when the detecting means has detected the decoding error part of the first TV broadcast signal the decoded second TV broadcast signal which corresponds to the first TV broadcast signal where the decoding error part has been detected, from the second storage device and uses the readout decoded second TV broadcast signal in decoding a next frame of the first TV broadcast signal, the synthesizing means stores the first TV broadcast signal decoded by the decoding means in the first storage device if the detecting means has not detected the decoding error part of the first TV broadcast signal, and reads out the part of the second TV broadcast signal corresponding to the decoding error part from the second storage device and stores the readout part in the first storage device if the detecting means has detected the decoding error part of the first TV broadcast signal, and wherein the first TV broadcast signal and the second TV broadcast signal are each a digital TV broadcast signal, and the first TV broadcast signal has a content identical to a content of the second TV broadcast signal, and is a signal modulated by a modulation system having a viewable receiving C/N ratio higher than a viewable receiving C/N ratio of a modulation system applied to the second TV broadcast signal.

8. A broadcast receiving circuit, comprising:

a receiving circuit which receives a first TV broadcast signal and a second TV broadcast signal;

a timesharing circuit which timeshares to output the first TV broadcast signal and the second TV broadcast signal received by the receiving circuit;

a decoding circuit which alternately decodes the first TV broadcast signal and the second TV broadcast signal timeshared to be outputted by the timesharing circuit;

a detecting circuit which detects a decoding error part of the first TV broadcast signal decoded by the decoding circuit with respect to each frame, generates a decoding error information, with respect to each frame, and includes error information and a presentation time stamp attached to the frame;

a synthesizing circuit which specifies the decoding error part of the first TV broadcast signal based on the error information in the decoding error information generated by the detecting circuit, specifies a frame of the second TV broadcast signal of which a time is the same as that of the decoding error part based on the presentation time stamp, and generates a composite signal obtained by replacing the specified decoding error part of the first TV broadcast signal with a corresponding part in the specified frame of the second TV broadcast signal;

a first storage circuit which stores the composite signal generated by the synthesizing circuit; and a second storage circuit which stores the second TV broadcast signal decoded by the decoding circuit, wherein the decoding circuit decodes the second TV broadcast signal and the first TV broadcast signal in this order with respect to frames having a presentation time stamp identical to each other, and stores, before the detecting circuit detects the decoding error part of the first TV broadcast signal, the part of the second TV broadcast signal corresponding to the decoding error part of the first TV broadcast signal in the second storage circuit, the decoding circuit reads out, when the detecting circuit has detected the decoding error part of the first TV broadcast signal, the decoded second TV broadcast signal, which corresponds to the first TV broadcast signal where the decoding error part has been detected, from the second storage circuit and uses the readout decoded second TV broadcast signal in decoding a next frame of the first TV broadcast signal, the synthesizing circuit stores the first TV broadcast signal decoded by the decoding circuit in the first storage circuit if the detecting circuit has not detected the decoding error part of the first TV broadcast signal, and reads out the part of the second TV broadcast signal corresponding to the decoding error part from the second storage circuit and stores the readout part in the first storage circuit if the detecting circuit has detected the decoding error part of the first TV broadcast signal, and wherein the first TV broadcast signal and the second TV broadcast signal are each a digital TV broadcast signal, and the first TV broadcast signal has a content identical to a content of the second TV broadcast signal, and is a signal modulated by a modulation system having a viewable receiving C/N ratio higher than a viewable receiving C/N ratio of a modulation system applied to the second TV broadcast signal.

\* \* \* \* \*